(No Model.)

J. P. GAMBLE.
NUT LOCK.

No. 547,917. Patented Oct. 15, 1895.

Witnesses:
L. C. Hills.
D. H. Naylor.

Inventor:
John P. Gamble,
By Wm. Val Brown,
Atty.

UNITED STATES PATENT OFFICE.

JOHN P. GAMBLE, OF LANSING, KANSAS.

NUT-LOCK.

SPECIFICATION forming part of Letters Patent No. 547,917, dated October 15, 1895.

Application filed July 31, 1895. Serial No. 557,698. (No model.)

*To all whom it may concern:*

Be it known that I, JOHN P. GAMBLE, a citizen of the United States, residing at Lansing, in the county of Leavenworth and State of Kansas, have invented certain new and useful Improvements in Nut-Locks; and I do hereby declare the following to be a full, clear, and exact description of the invention, such as will enable others skilled in the art to which it appertains to make and use the same.

This invention relates to a new and useful improvement in nut-locks; and it consists in the construction and arrangement of parts hereinafter described, and definitely pointed out in the claims.

The aim and purpose of this invention is to construct a new and useful improvement in nut-locks which may be stamped from a single integral sheet of steel or other metal, by which the nut is positively locked in place, and one in which the washer can be used again after the nut has been removed. This washer is especially adapted to be used in connection with rail-joints, and when so used they are applicable to the rails, fish-plates, bolts, and nuts now in ordinary use. Although I have shown my invention as applied to a rail-joint, it is evident that my invention can be used wherever it is necessary or desirable to use a nut-lock.

These objects are obtained in the construction shown in the accompanying drawings, wherein like numerals of reference indicate corresponding parts in the several views, and in which—

Figure 1:
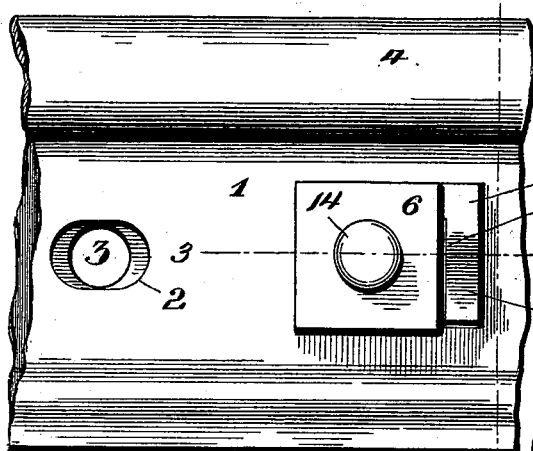
Figure 2:
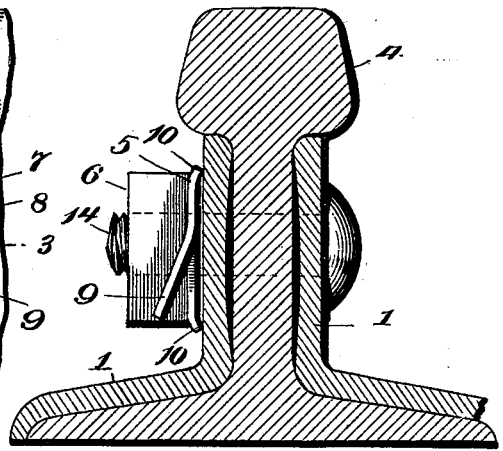
Figure 3:
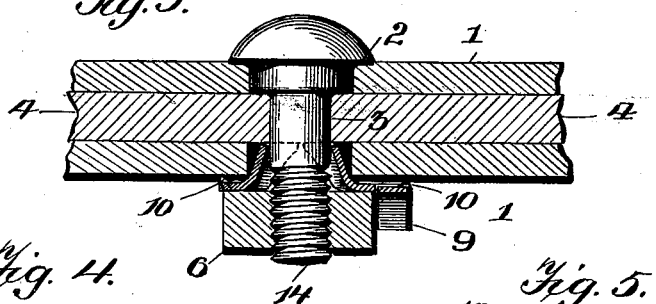
Figure 4:
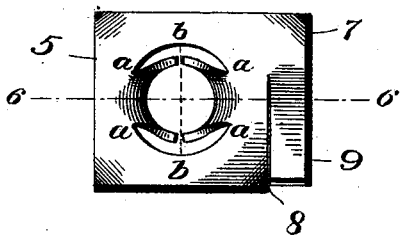
Figure 5:
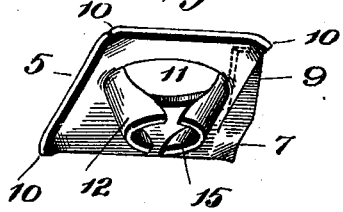
Figure 6:
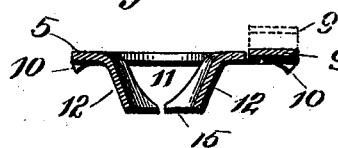

Figure 1 is a front elevation showing my improved nut-lock applied to a rail. Fig. 2 is a cross-section on the line 2 2, Fig. 1. Fig. 3 is a horizontal section on the line 3 3, Fig. 1. Fig. 4 is a top plan view of the washer detached. Fig. 5 is a perspective view of the washer detached; and Fig. 6 is a section on the line 6 6, Fig. 4.

In the drawings, 1 represents ordinary fish-plates which are used in making continuous rail-joints in the construction of railroads and are placed on opposite sides of the rails, as shown in Figs. 2 and 3. These fish-plates as now constructed are formed with elongated apertures 2, which are larger than the apertures 3 in the rail 4, as shown in Figs. 1 and 3. My improved washer is adapted to be used in connection with this ordinary style of fish-plate without in any manner altering the construction thereof, and can be used again after the nut has been removed.

5 designates my improved washer, which is stamped from a single piece of sheet metal or other suitable material and is preferably rectangular, although in practice I might construct it of a shape other than rectangular. This washer is of a size to correspond with the size of a nut 6, and has a protruding portion 7 extending on one side of the nut, as shown in Fig. 1. This portion 7 is split at 8 on a line with the side of the nut a suitable distance, and this split portion is bent upward, forming a strong outwardly and upwardly bent pliable spring-tongue 9. When the washer is in place, this spring-tongue 9 will extend outward and downward, as shown in Fig. 2, in order that no dirt or débris can lodge under the spring-tongue when the washer is in use, and the tongue can be readily forced down to remove the nut.

The corners of the washer are slightly bent inward, forming points or teeth 10, which impinge against the side of the fish-plate when the nut 6 is forced inward to give tension to the washer to prevent rattling or moving of the washer on the plate.

The washer is formed with a preferably central oval-shaped or elongated opening 11, with an inwardly-protruding tapering collar 12, which is oblong at the washer to correspond with the shape of the aperture in the fish-plate, and gradually becomes circular to its outer end to embrace the circular sides of the bolt 14, as shown at 15, Figs. 5 and 6. It will be seen that the screw-threaded end of the bolt 14 is smaller than the aperture in the fish-plate, and that there is ample room for the collar to be placed in the aperture in the fish-plate and around the bolt, as shown in Fig. 3. This collar is punched from the washer by splitting the washer on the elliptical lines *a a*, Fig. 4, and the straight cross-line *b b*, and then inserting any suitable punch or die to force the collar into the shape described. It will thus be seen by this construction that the outer upper sides of the collar being oblong or elongated will impinge against the apertures in the fish-plate and tend to prevent any lateral movement of the plate caused by the vibration of a passing train, and the outer ends of the collar being circular will engage the sides of the bolt and help to keep the washer firmly in place. This construction will also center the bolt in the aperture in the fish-plate, so that after the fish-plate, bolt, and washer have been placed in position the fish-plate will be firmly held in position, the bolt centered in the aperture in the said plate, and it is only necessary to screw on the securing-nut.

It will also be seen from the construction just described that I make a washer from a single integral blank, which will securely lock the nut in position and at the same time prevent any lateral movement of the fish-plate and center the bolt in the aperture in the said plate.

I am aware that it is not broadly new to employ a plate provided with a spring-tongue for holding or locking a nut in place but;

What I claim as new, and desire to secure by Letters Patent, is—

1. A nut lock, consisting of a washer having an oval shaped elongated aperture therein, a tapering collar extending inwardly from the aperture, the upper sides of the collar being oval shaped to correspond with the shape of the aperture and the lower outer end of the collar formed circular, and adapted to engage the sides of a bolt and center the same when the collar is inserted in the aperture in the fishplate, substantially as described.

2. A nut lock, consisting of a washer having an oval shaped elongated aperture therein, a tapering collar extending inwardly from the aperture, the upper sides of the collar being oval shaped to correspond with the shape of the aperture and the outer end of the collar formed circular, and an outwardly bent spring tongue on one side of the washer, substantially as described.

3. A nut lock, consisting of a washer having inwardly bent corners and formed with an oval shaped elongated aperture therein, a tapering collar extending inwardly from the aperture the upper sides of the collar being oval shaped to correspond with the shape of the aperture and the outer end of the collar formed circular and an outwardly bent spring tongue on one side of the washer, substantially as described.

4. A nut lock, consisting of a washer stamped from a single piece of metal having an aperture therein, a collar extending inwardly from the aperture and a spring tongue on one side of the washer, substantially as described.

5. A nut lock washer, consisting substantially of a single piece of sheet metal having an oval shaped elongated aperture 11 therein and tapering collar 12 extending inwardly from the aperture, the upper sides of the elongated collar 12 being oval shaped to correspond with the aperture in the fish plate, and the lower end of the collar 15 formed circular to fit the bolt 14 each part filling its space to stop the lateral motion of the fish plate and keep the washer and nut from turning and a lateral portion of the washer slit by a cut forming an outwardly bent tongue to lock the nut, substantially as described.

In testimony whereof I affix my signature in presence of two witnesses.

JOHN P. GAMBLE.

Witnesses:
BERTHA L. DANA,
CHRISTIAN J. UBHOFF.